United States Patent [19]

Garzonetti

[11] Patent Number: 4,693,831
[45] Date of Patent: Sep. 15, 1987

[54] RISE-RATE CONTROL OF PULSED-BED GRANULAR MEDIUM FILTERS

[75] Inventor: Gary A. Garzonetti, Chicago, Ill.

[73] Assignee: Zimpro Inc., Rothschild, Wis.

[21] Appl. No.: 8,020

[22] Filed: Jan. 28, 1987

[51] Int. Cl.$^4$ .............................................. B01D 37/00
[52] U.S. Cl. .................................... 210/744; 210/785; 210/786; 210/795
[58] Field of Search ........ 210/744, 785, 786, 792–795, 210/807, 108, 274

[56] References Cited

U.S. PATENT DOCUMENTS

| | | | |
|---|---|---|---|
| 3,459,302 | 8/1969 | Ross | 210/796 |
| 3,717,251 | 2/1973 | Hampton | 210/795 X |
| 3,817,378 | 6/1974 | Ross | 210/794 X |
| 4,019,985 | 4/1977 | Fuller et al. | 210/795 |
| 4,627,923 | 12/1986 | Ross | 210/744 |

*Primary Examiner*—Tom Wyse
*Attorney, Agent, or Firm*—Allen H. Erickson

[57] ABSTRACT

A method for controlling the pulsing of a granular medium filter, based on determination of the rise rate of liquid level above the filtration medium. A pulse system is activated whereby sub-fluidizing pulses of a fluid are directed upwardly through the filter medium from an array of orifices, and each pulse is initiated whenever the determined rise rate attains a predetermined value. The pulses dislodge solids from the upper surface of the bed and store a portion of the solids within the bed itself at particular loci, for decreasing the resistance of the bed and reducing the rise rate. The frequency of backwash is optimized over a wider range of solids load, liquid load and other factors affecting the filtration.

20 Claims, 5 Drawing Figures

RISE-RATE CONTROL OF PULSED-BED GRANULAR MEDIUM FILTERS

BACKGROUND OF THE INVENTION

1. Field of the Invention

This invention relates to the art of filtering particulate solids and other matter from liquids, and more specifically, to an improved method and apparatus for filtering with a granular medium filter such as a sand filter.

2. Information Disclosure Statement

Granular medium filters such as sand filters are widely used to remove particulate material and other matter from wastewaters, potable water supplies, and the like. Such filters trap fine particulate matter in the interstices between granules in the upper portion of the filter bed, and larger size particles form a layer on the filter surface. Eventually, the flow of liquid through the filter bed is hindered so that the liquid level above the bed rises. The plugging materials are removed periodically by stopping the flow of influent water and backwashing with already-filtered water. Usually, the filter is backwashed when the liquid level or liquid head above the filter bed reaches a predetermined height.

Influent waters typically vary in suspended solids content, size and nature, as a function of time. In most cases, the flow rate or hydraulic load also widely varies with time. Such variations result in frequent backwashing during some periods, and less frequent backwashing at other times. The frequency variation is sometimes diurnal, but often cannot be predicted with much certainty. Higher concentrations of fine particles in the influent water lead to faster clogging and the need for more frequent backwashing.

Extending the filtration time between backwashing has several advantages. First, downtime is minimized, thus maximizing effective filtration time. Second, the total quantity of solids loaded onto the filter bed between backwashes is increased. With a constant volume of backwash water, the solids concentration in the backwash water is increased. This reduces the overall hydraulic load placed on subsequent backwash water treatment equipment. Whenever backwash water is recycled to the head end of a treatment plant, it adds to the hydraulic load and solids load of the plant. The backwash water is more easily treated when it comprises a small volume containing concentrated solids. This is best accomplished by longer filter runs between backwashes.

Several methods have been used to prolong the filter run length between backwashes, without using additional filter area. Ross U.S. Pat. No. 3,459,302 discloses a granular medium filter in which currents are created in the liquid above the filter bed surface by an air diffuser. These currents sweep across the surface, removing solids and maintaining them in suspension in the liquid above the filter surface.

Another very effective means for reducing the frequency of backwashing is described in Ross U.S. Pat. No. 3,817,378. In this reference, at the time a filter bed begins to clog, streams of air are forced upward through the medium in intermittent pulses of short duration. Some variations of this procedure are known as "air scour". A portion of the filtered solids is forced into liquid suspension, while another portion is concentrated by sub-fluidizing medium movement into localized sites within the bed itself. Thus, some of the solids are "stored" within the filter bed, reducing the quantity of solids which produce the flow resistance at the bed surface. This filter cleaning operation is generally repeated a number of times between backwashes, greatly extending the filtration time before backwashing is required.

The quantity of filtered solids which may be stored in the bed without adversely affecting the filtration rate is limited. This generally limits the number of pulses which may be advantageously performed between backwashes.

As currently practiced, the air scour or pulse system is activated when the liquid level above the filter bed rises to activate a first level detector. This detector is generally situated at a low position in the filter tank. Additional pulses are initiated on a timed basis at present intervals of 6–30 minutes, depending upon the expected solids loading and hydraulic loading. Backwashing is typically initiated when a second level detector, located at a level higher in the filter tank, is activated by the high liquid level.

Influent liquids with a high solids content tend to clog the filter rapidly, requiring more frequent pulsing as well as more frequent backwashing. A given present pulse interval is optimal only at a single solids loading rate. In most situations, the solids loading rate varies rapidly and widely with time, so that a given constant pulse interval alternates between being too short and being too long. This inefficient operation increases the frequency of backwashes and/or greatly increases the number of unneeded pulses between backwashes.

SUMMARY OF THE INVENTION

The present invention is an improved method and apparatus for operating a down-flow granular medium filter such as a sand filter. The effective filtration time between backwashes is increased, and the quantity of backwash water requiring treatment is reduced. This invention is applicable to filters which are adapted for periodic backwashing and for multiple intermittent upwardly-directed sub-fluidizing pulses of fluid at times other than during backwash. Such filters include a granular medium filter bed with an upper and lower surface. The bed is in a filter tank which permits a head of liquid to be maintained above the bed. The pulse system comprises upwardly-directed multiple sub-fluidizing pulses of a fluid passed through the filter bed from an array of orifices beneath or in the bed.

The influent liquid from which particulate solids are to be removed is continuously introduced into the filter tank for downward solids-removing passage through the filter bed.

The generally rising liquid level or head above the filter bed is monitored, and a rise rate of the liquid level is determined.

The pulse system is activated so that whenever the rise rate reaches a predetermined pulse-initiation value, a pulse of fluid at sub-fluidizing velocity is initiated. Flow of influent liquid may be continued during the pulses.

Each pulse of fluid is continued for 5 to 180 seconds and produces a recirculation of medium particles in the upper portion of the bed at each site of upward fluid movement. The pulsed fluid dislodges solids from the upper surface of the filter bed and folds a portion of them into the bed itself, where they are stored at local sites within the bed. As a result, the flow resistance of the filter is lowered, and the rise rate is reduced, extending the filtration time before backwashing is required.

Following completion of one or more pulses, a fluidizing backwash is subsequently initiated to remove filtered solids into a backwash liquid which is removed from the filter tank for treatment or disposal.

Control of the pulse initiation on the basis of rise rate results in frequent pulses during periods of high solids loading, and infrequent pulses during periods of low solids loading. Thus, the filter pulse system may be fine-tuned to provide the longest possible filtration time with a minimum number of pulses, despite wide variations in both solids loading and hydraulic loading. During periods of high loading, the control method of this invention prevents prematurely activated backwashes.

DESCRIPTION OF THE PREFERRED EMBODIMENT

The method of pulsing a granular medium filter according to this invention is illustrated with reference to the figures. Certain features of a typical filter construction are shown in partial cross-section in FIG. 1. The filter is merely representative of filters adaptable to pulsing according to the present invention.

Figure 1:
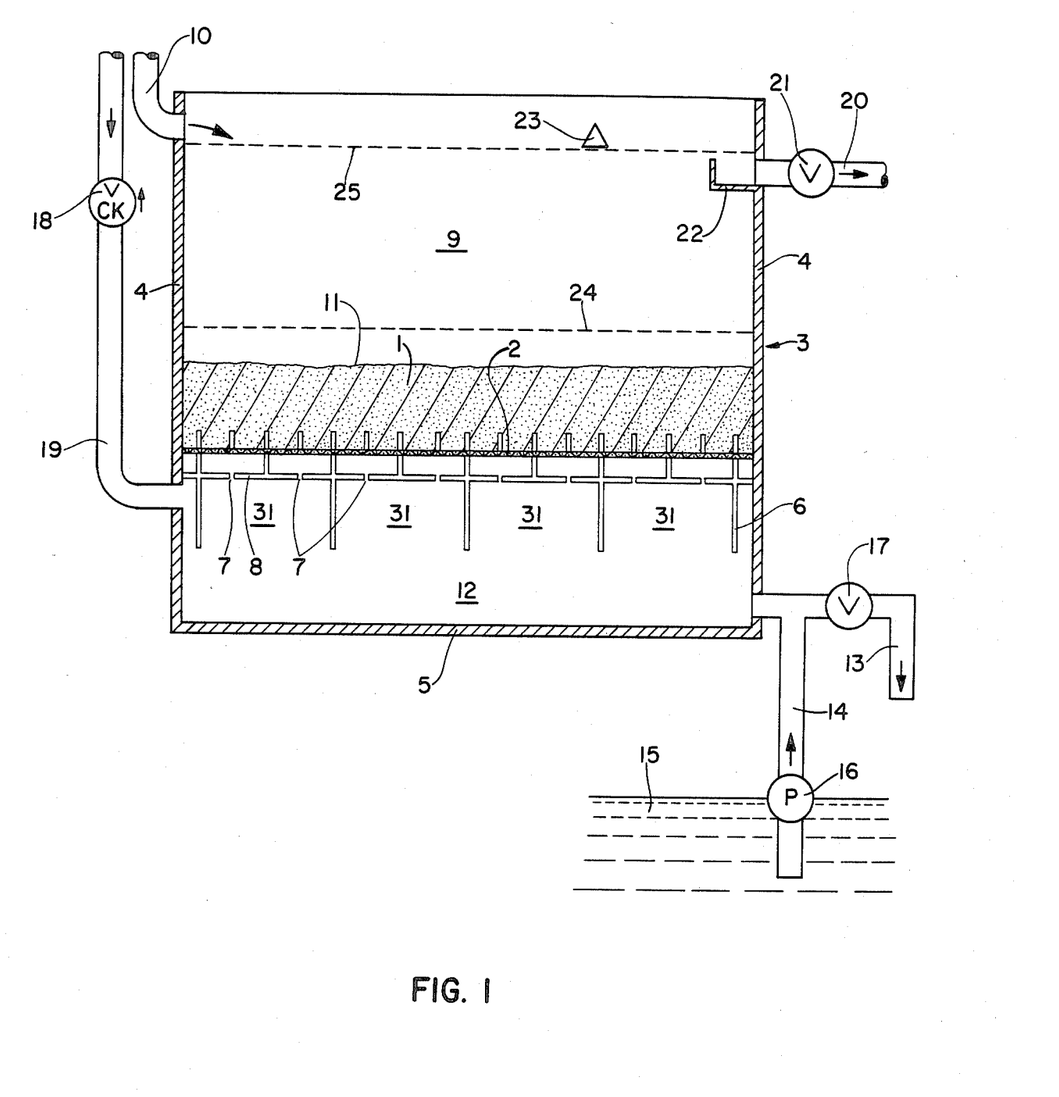
FIG. 1 is a side elevational view showing in somewhat schematic form a granular medium filter to which the present invention may be applied.

A bed 1 of granular medium such as sand is supported on a screen 2 within filter tank 3 having tank walls 4 and tank bottom 5. An underdrain structure 6 supports screen 2 and contains an array of orifices 7 in underdrain plate 8 through which filtrate drains. In this embodiment, the same apertures direct a pulsing fluid upwards during the pulsing operations. Other alternative underdrain structure configurations may be used. In some embodiments, the pulsing fluid does not flow through such orifices in the underdrain structure but enters the bed through conduits within the bed itself. In this case, the pulse of fluid passes through the portion of the bed above the orifices, and the lower portion of the bed remains relatively quiescent during the pulse. This is the preferred method for pulsing with a liquid such as filtrate, although gases may be introduced this way as well.

In FIG. 1, influent liquid to be filtered enters the head space 9 above filter bed 1 through inlet 10. Influent liquid generally is directed to the upper bed surface 11 by a distributor, not shown. Solids suspended in the liquid are retained by filter bed 1 and the filtered liquid passes through the bed and through apertures 7 into the underdrain cavity 12. The filtrate is discharged through line 13 to final disposal or further treatment. A portion of the filtrate is retained in clearwell 15, where it is stored for backwashing and pulsing the filter bed 1 by closing valve 17 and activating pump 16 to pump filtrate through conduit 14 into cavity 12. Checkvalve 18 in vent 19 permits atmospheric air to enter underdrain cavity 12 but prevents liquid from passing upward therefrom. During backwash, backwash liquid containing filtered solids overflows into backwash conduit 20 having valve 21. The backwash overflow 22 need not be at the upper portion of the filter tank. Theoretically, the quantity of backwash liquid required to effectively clean the filter bed is less when the overflow 22 is at a lower level, but the level must be high enough to avoid substantial loss of fluidized medium particles with backwash water.

A liquid level detector or monitor 23 is shown in the upper portion of head space 9. This monitor may be any means which accurately measures the liquid head above the filter bed surface or some function proportional to the head. A filter controller, not shown, receives liquid level data from monitor 23 for controlling the pulse system, and optionally, initiation of the backwash procedure. For example, the pulse system may be activated when the liquid level or head above the filter bed 1 attains the predetermined first value 24. This activation initiates the first pulse and activates rise-rate control of subsequent pulses.

Backwashing of the filter bed may be initiated when monitor 23 signals that the liquid level has attained a predetermined second value 25. This liquid level is higher than first value 24 and is generally high in the head space 9. Pulsing of the filter first occurs when the liquid level is at value 24, and will not occur at a level exceeding value 25.

The apparatus is pulsed by shutting valve 17 and turning on pump 16 to transfer filtrate from clear well 15 into underdrain cavity 12. As the cavity fills, excess air is expelled through vent 19. When the liquid level in cavity 12 reaches the lower edges of the underdrain structure 6, and rises in each of the cells 31, it forces air trapped in the cells through orifices 7 and upward through bed 1 in a pattern of spaced loci. The velocity of the liquid pumped by pump 16 is controlled to achieve an air velocity through the bed which is sub-fluidizing but sufficiently high to remove solids from bed surface 11 and to fold a portion of the solids into the bed. When the pulsing fluid is a gas passed upward through orifices in the underdrain structure, the preferred velocity through the orifices is 1–5 feet per second (0.3–1.52 m/second). The average upward gas velocity based on the total bed cross-sectional space is preferably between 1 and 3 feet per minute and most preferably between 1.5 and 2.0 feet per minute. The pulse is continued until the liquid pumped by pump 16 approaches the orifices 7, or for a shorter time if desired. The pulse may even be continued by passing liquid at sub-fluidizing velocity through the orifices and bed if so desired. Pulsing with gas at sub-fluidizing velocity followed by backwashing with liquid at fluidizing velocity may be performed.

The preferred pulse time is 5–180 seconds, with a most preferred time of 10–120 seconds.

Following a pulse valve 17 is opened and pump 16 is shut off. The underdrain cavity is allowed to drain.

It should be noted that the pulse system may be activated by means other than a predetermined first value 24 of liquid level. Alternatively, activation may be at a preset timed interval after initial introduction of the influent liquid into the filter tank at the beginning of the filtration cycle.

Likewise, the backwash may alternatively be initiated by either (a) a predetermined second value of liquid level higher than the first value, (b) completion of a predetermined maximum number of pulses, or (c) on a simple timed basis. Several initiating criteria may be simultaneously used. In the preferred mode, completion of a predetermined maximum number of pulses prevents further pulsing, and the liquid is then permitted to rise to a predetermined level which initiates the backwash. Preferably, the predetermined number of pulses before backwashing is 8–30. Attainment of the backwash initiating level before the predetermined number of pulses is reached precludes further pulses, and backwashing is initiated.

Figure 2:
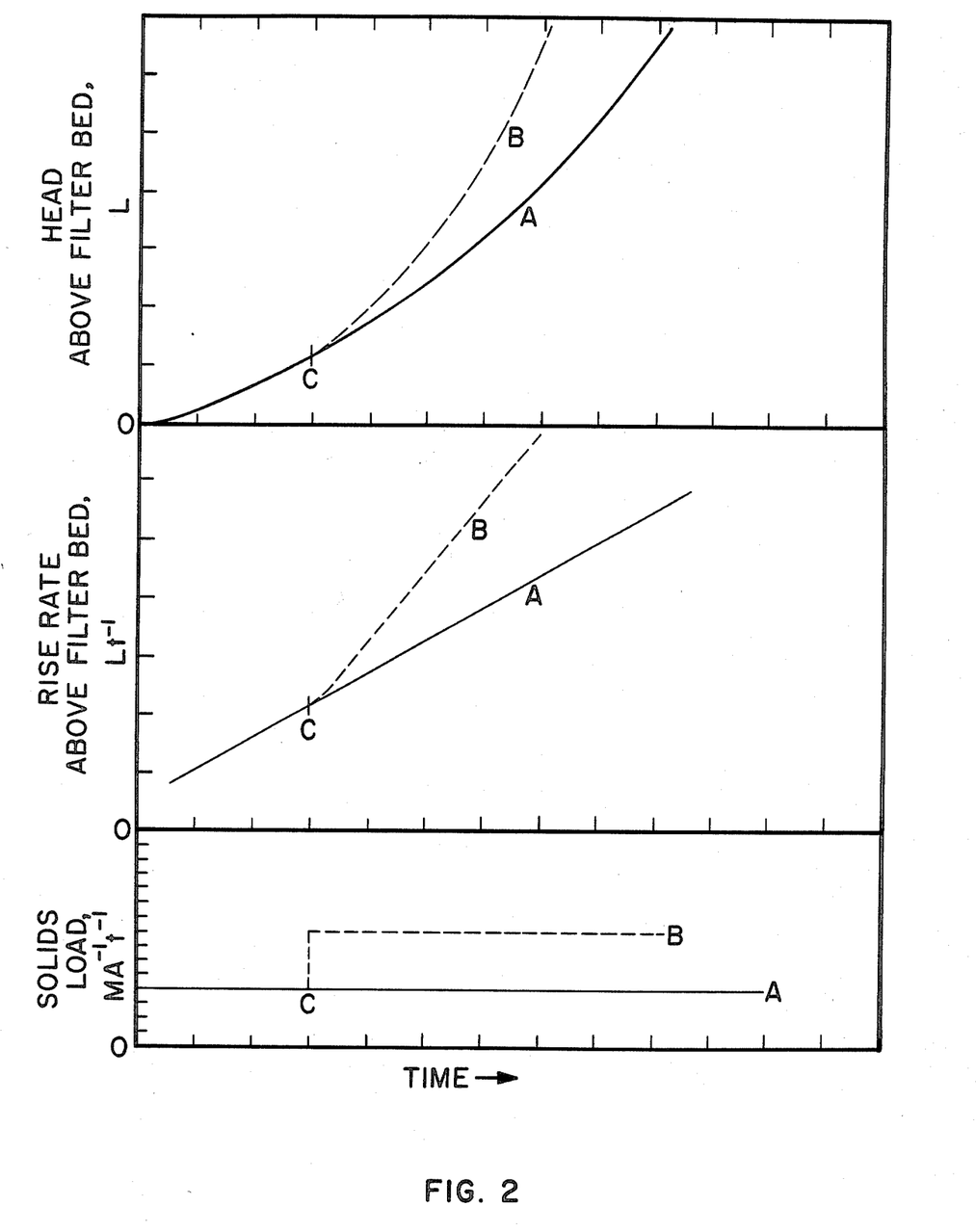
FIG. 2 is a graphical depiction of the liquid head and rise rate of a granular medium filter operated without pulsing means.
Figure 3:
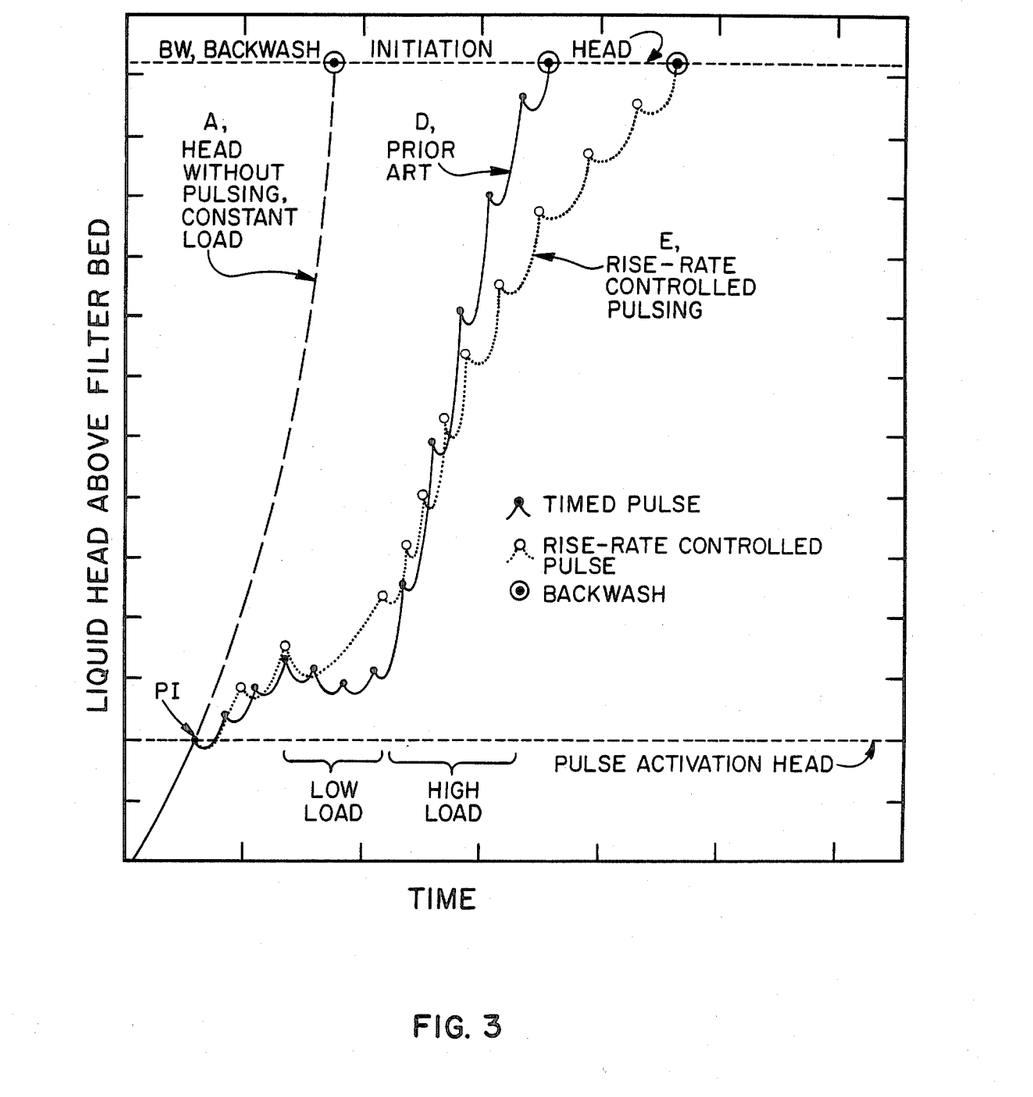
FIG. 3 shows by graphical depiction the operation of a pulsed graular medium filter of the prior art under variable loading conditions.

FIGS. 2 and 3 present background information to which the present invention is applied. The principles shown apply both to prior art filtration practice as well as to this invention.

FIG. 2 shows the relationship between solids load, head and rise rate in a granular medium filter. The effects of pulsing and backwashing are not shown. Solids load is expressed as units of mass M applied to each unit of upper surface area A of the filter bed per unit time t. Exemplary units are pounds per square foot per minute or kilograms per square meter per minute. Head may be expressed as unit height L, e.g. feet or meters; and rise rate $Lt^{-1}$ of the head as feet per minute or meters per minute. The rise rate is positive when the head is increasing, negative when the head is decreasing, and zero for a constant head.

In any incremental time period, the quantity of liquid which is introduced into the filter tank equals the quantity which passes through the filter bed plus the quantity which accumulates above the filter bed to increase the liquid head. Therefore, rise rate may also be expressed in the volume change per unit time, for example, gallons per minute or liters per minute. Any expression which reflects the quantitative difference between the influent liquid flow rate and the actual filtration rate may be used for the rise rate.

The curves shown in FIG. 2 are hypothetical. For the purpose of illustration, a constant hydraulic rate is assumed. It is also assumed that the solids in the influent liquid are uniform in size, shape, density and compressibility.

The relationship between liquid head and rise rate, at constant solids load, is typified in curves A in idealized form. The changes in head and rise rate when the solids load is suddenly increased at C are shown in curves B. In this example, the rate at which the rise rate increases is approximately doubled by a doubling of the solids load.

Although the rise rate relationship is shown in FIG. 2 as approximately linear, such is not necessarily the case in actual practice. In typical practice, of course, not only does the solids load vary with time, but the hydraulic load as well as the filtering characteristics of the solids constantly change. These variations may be large. For example, the variation about the mean hydraulic load and solids load may each be ±100 percent or more.

Turning now to FIG. 3, filter operation according to the present invention is compared to the prior art. The liquid head above the filter bed is shown as a function of time, the axis of the latter compressed relative to that in FIG. 2.

The backwash initiation head is the liquid level at which the backwash operation is initiated. Such backwash generally includes the upward flow of liquid, usually filtrate, through the filter bed at a rate which fluidizes the bed granules and the filtered solids trapped thereon. The liquid level rises to a discharge port through which the backwash fluid and solids are removed from the filter tank. The upward velocity of backwash fluid in the bed, although fluidizing, is controlled to minimize or eliminate the transport of bed granules all the way upward to the backwash discharge port, where they will be lost in the backwash water. The backwash operation is continued until most of the filtered solids have been swept from the filter tank. The flow of influent liquid is, of course, usually halted while backwashing, to minimize dilution of the backwash liquid. The typical backwash time for filtration of wastewaters ranges from about 2 to 30 minutes, after which time the filter is readied for a further filtration cycle.

Curve A of FIG. 3 illustrates the rise in head under constant load, without use of a pulsing system of either the present invention or the prior art. This condition corresponds to condition A of FIG. 2 shown as the uppermost curve A in that figure. The backwash initiation head is reached relatively quickly. The high frequency of backwashes result in a large quantity of backwash water which must be treated. The net time available for filtration is also limited.

Curve D illustrates the change in liquid head with time for a filter pulsed according to the prior art, e.g. pulsed at regular time intervals. Curve E shows the head change of the same filter pulsed according to this invention, e.g. pulsed whenever the rise rate of the liquid level achieves a predetermined value. In both cases, the pulse system is shown as being first activated when a relatively low predetermined liquid level, designated as PI, is attained. Other activation means may be used in place of liquid level. For example, this invention encompasses the activation of the pulse system at a preset time following the initial introduction of influent liquid into the filter tank at the beginning of the filtration cycle.

The performance of the two systems is compared for a filtration cycle including a time period of low load followed by a high load period.

Pulsing according to the prior art method results in uniformly timed pulses regardless of the changes in load or rise rate. Thus, the pulses occur more frequently than necessary during low load periods, and less frequently than necessary during high load periods.

In the present invention, the pulse frequency is dependent upon the total effect of all factors tending to change the rise rate of the liquid level above the filter bed. These factors include solids load, hydraulic load, filtration characteristics of the filtered solids, the time interval since the prior pulse, the time interval since the prior backwash, the number of pulses already completed in the filtration cycle, and the filter bed medium characteristics. When compared to the system with equally timed pulses, the invention reduces the pulse frequency during periods of low loading. During periods of high loading, the present invention reduces the overall rise rate to prevent premature backwash. In has been found that the number of pulses performed in a single filtration cycle often must be limited to preclude the need for extended backwashing periods, or the frequent use of detergents to clean the filter medium. With some wastewaters, the optimum number of pulses in each cycle has been found to vary from 10 to 20. With other influent liquids, the predetermined maximum number of pulses to achieve optimum filtration may be as low as 8 or as high as 30.

Figure 4:
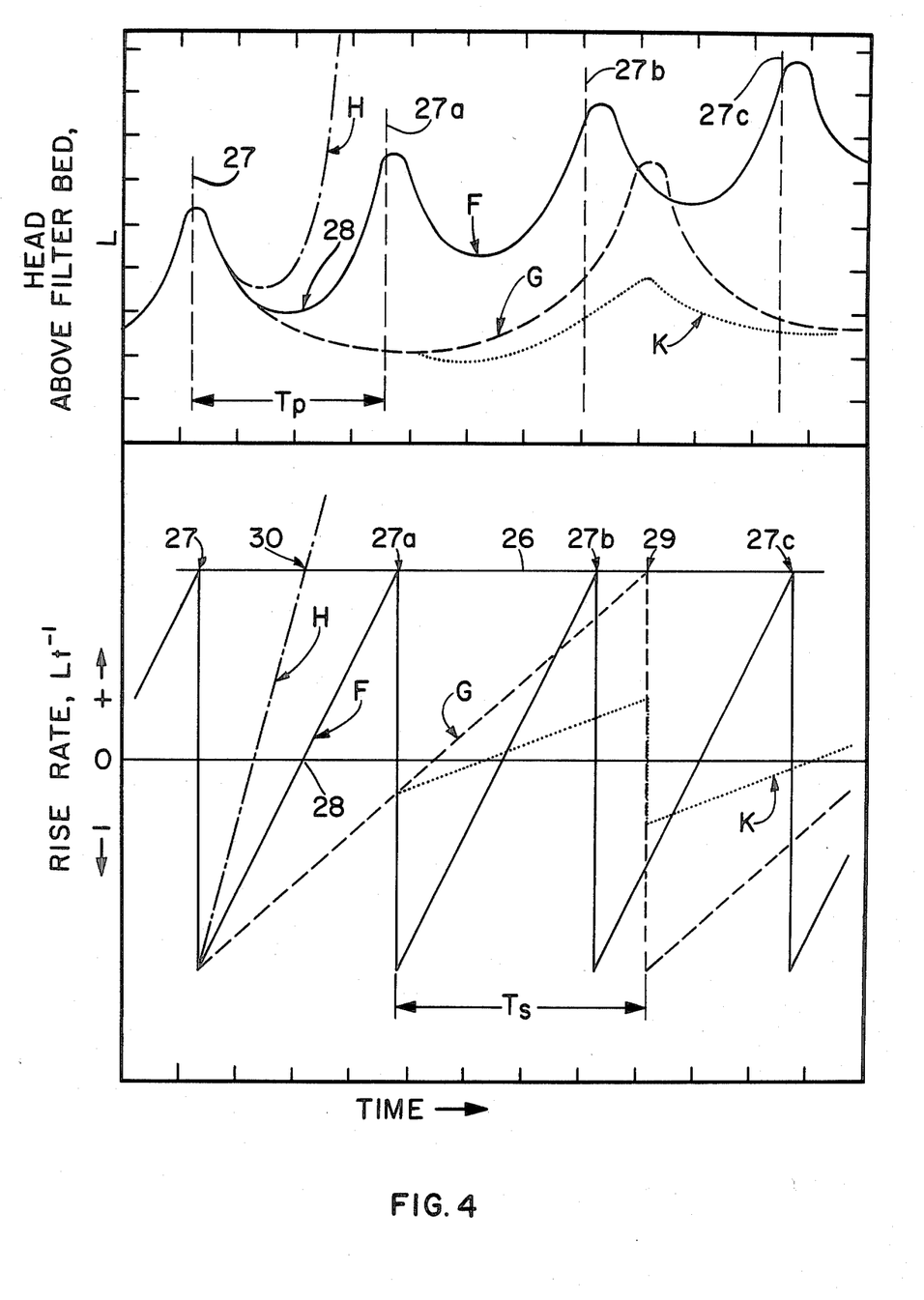
FIG. 4 is a graphical presentation of the present invention operating under varying solids load, compared with the prior art method.

Turning to FIG. 4, the relationship between rise rate and pulse frequency is illustrated. The ordinate and abscissa axes are expanded. In the lower graph, rise rate is plotted as a function of time for pulses occurring after the pulse system has been first activated. The corresponding head is shown in the upper graph. Several different load conditions are illustrated.

Curves F apply to a situation in which the uniformity of solids load, hydraulic load, and other factors affecting the filtration rate result in a constant change in rise rate following each pulse. Each pulse is initiated when the rise rate attains predetermined value 26, that is, at times 27, 27a, 27b, and 27c, having a pulse interval Tp.

Generally, pulsing results in an immediate reduction in rise rate. The rise rate, in fact usually becomes negative, i.e. the liquid level falls. The nadir 28 of the liquid level between consecutive pulses corresponds to a rise rate of zero.

Curve G illustrates the effect of a load lower than that of Curve F. The rise rate increases more slowly so that the time interval between pulses 27 and 29 is greater than the intervals of Curve F.

Curve H shows the effect of an increased load. The rise rate increases rapidly, and a pulse 30 will occur after a shorter time interval. Use of the prior art method in this situation will result in a delay of the pulse until the preset timed pulse interval had elapsed. The head will rise to an excessive level, and may even trigger the initiation of the backwash.

In curve K, the low load of curve G occurs with a system pulsed at a timed interval of $T_s$ according to the prior art method. The pulses occur at a higher frequency than necessary, and an excessive portion of the filtered solids is stored within the bed, leading to a more rapid deterioration of filtration. The effective filtration time before backwashing will be abbreviated.

Figure 5:
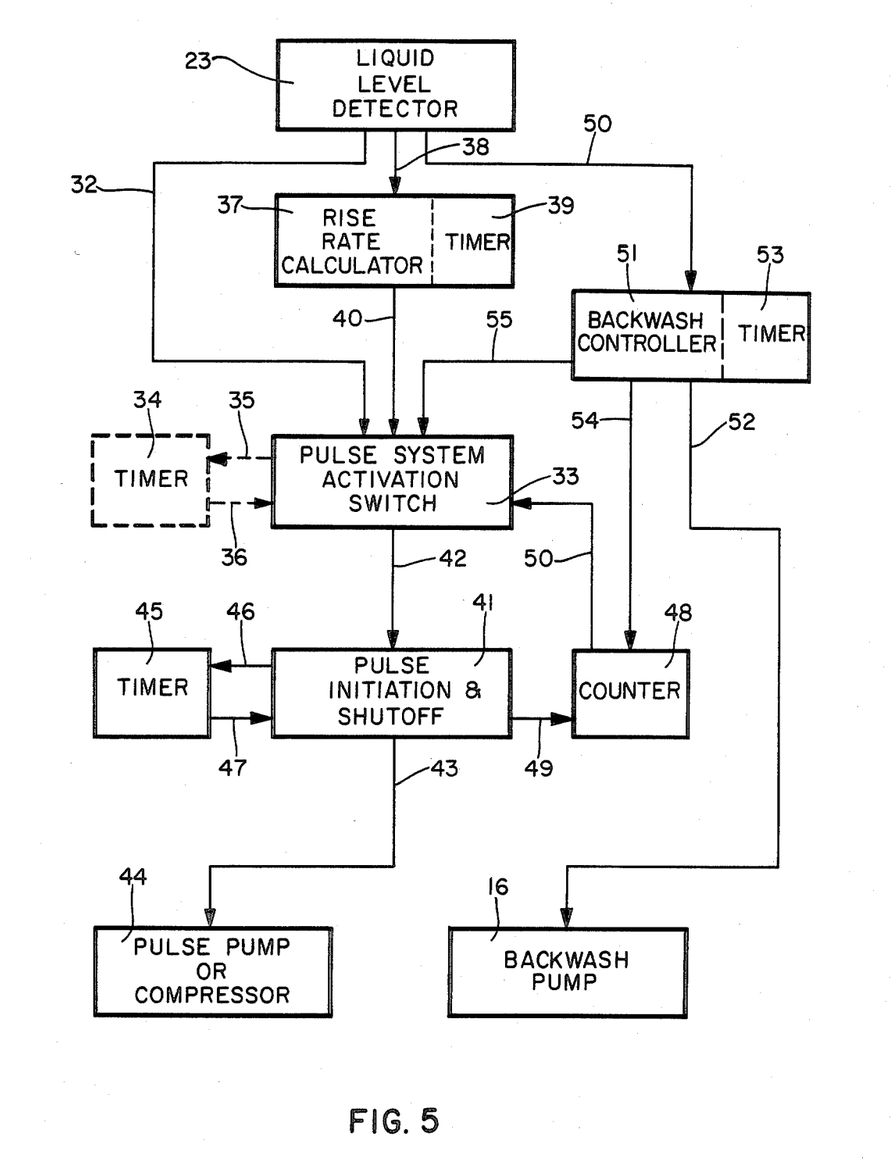
FIG. 5 is a logic diagram of the control means of the invention.

The logic diagram of FIG. 5 illustrates the system for controlling a granular medium filter according to the various embodiments of this invention. Liquid level detector or monitor 23 measures the liquid level above the filter medium surface 11, or some function thereof, as already shown in FIG. 1. Level signal 32 from liquid level detector 23 is shown as activating pulse system activation switch 33 to start the pulse system at a predetermined first value 24 of liquid level shown in FIG. 1. While this is the preferred embodiment, the pulse system may alternatively be activated by a timer 34 at a predetermined time interval from the start of the cycle of filtration. The timer may be started, for example, when the backwash is completed, when the influent liquid is first introduced after backwashing, or even manually. The timing cycle should have some relationship to the beginning of filtration, however, whether the timing is initiated manually or automatically. Timer 34 is shown as receiving a signal 35 for initiating the timed cycle, and sending signal 36 to the pulse system activation switch 33 to activate the system.

Rise rate calculator 37 receives level signal 38 from liquid level detector 23 and calculates a rise rate in units of height/time, using time increments from timer 39. When a predetermined value 26 of rise rate is indicated, signal 40 is sent by calculator 37 through pulse system activation switch 33 to pulse initiation and shutoff 41 via signal 42. The rise rate signal 40 is shown as passing through pulse system activation switch 33 because it is necessary that the pulse system be activated for the pulse initiation and shutoff 41 to initiate a pulse.

Upon receiving rise rate signal 42 calling for a pulse, pulse initiation and shutoff 41 turns on pulse pump or compressor 44 via signal 43, initiating the pulse of fluid through the filter medium. Pulse initiation and shutoff 41 also initiates timer 45 through signal 46 to limit the time of the pulse to a predetermined number of seconds. Timer 45 signals pulse initiation and shutoff 41 via signal 47 to shut off the pulse pump or compressor 44 when the predetermined pulse time has expired. Timer 45 may also be used to control the length of time between successive pulses to some preset minimum. Otherwise, extremely high loading may result in pulses too close together. If such is allowed, the overall filtration rate suffers, and additionally, the backwash may be prematurely initiated. When the pulses of air are generated by a rising liquid level, below the filter bed, as shown in FIG. 1, a minimum time must be maintained between pulses to enable filtrate to drain sufficiently from cavity 12 and be replaced by air for pulsing.

Counter 48 is also shown as being initiated by a signal 49 from pulse initiation and shutoff 41. In the preferred embodiment, the number of pulses prior to backwashing is limited to a predetermined maximum number. In this embodiment, counter 48 sends signal 50 to pulse system activation switch 33 or to other means which prevents further pulses until the filter has been backwashed. Without further pulses, the liquid level will rise to a predetermined second value at which the backwash is to be initiated. Backwash controller 51 receives liquid level signal 50 and activates backwash pump 16 by signal 52, starting the backwash when the predetermined second value of liquid level is attained. Backwash timer 53 controls the length of time that the backwash pump 16 remains on, signalling the backwash controller 51 to shut off the pump at the desired predetermined backwash time. Backwash controller 51 also controls other actions required to backwash the filter, such actions including closing and opening of valves as previously described and shown in FIG. 1. Backwash controller 51 also resets counter 48 via signal 54 in preparation for the next filtration cycle, permitting the pulse system to be activated.

Extremely high loading or some other factor may result in the liquid level reaching the second predetermined level before the maximum preset number of pulses has been initiated. In this case, backwash controller 51 transmits signal 55 to pulse system activation switch to prevent the pulse system from initiating a pulse during the backwash operations.

In certain embodiments of this invention, the time between consecutive pulses is limited by the controller to preset minimum and/or maximum values. Thus, in a system in which the rise-rate controlled pulses normally occur at intervals of 12–30 minutes, a minimum pulse interval of 5–8 minutes may be maintained to allow the underdrain cavity 12 to empty into the clearwell 15 before the next pulse is initiated. Preferably, the minimum preset time delay may be varied between 2 and 30 minutes.

Likewise, it may be found advantageous to preset a maximum pulse interval. Preferably, the maximum preset time interval between pulses is 20 to 300 minutes.

It must be noted that the description of FIG. 5 is an explanation of one particular example of the control method. Other embodiments may be utilized in this invention, provided the pulse system is operated to initiate the pulse as a function of the measured rise rate. For example, a multi-purpose timer may be used to perform the functions of several or all of timers 34, 39, 45 and 53, and the particular controller functions and switches may be arranged in any systematic order which achieves the control method as defined in the claims appended hereto.

I claim:

1. A method for removing solids from an influent liquid during a filtration time in a filtration cycle by passage through a down-flow granular medium filter bed in a filter tank, said filter bed having an upper surface and a lower surface and adapted for periodic backwashing and upwardly directed sub-fluidizing pulses of fluid from an array of orifices at times other than during backwash, comprising:
    (a) continuously introducing said influent liquid into said filter tank for downward solids-removing passage through said filter bed;
    (b) monitoring influent liquid level above said filter bed in said filter tank;
    (c) determining a rise rate of said influent liquid level;
    (d) activating a pulse system comprising upwardly-directed multiple sub-fluidizing pulses of a fluid through said filter bed from said array of orifices, each said pulse initated whenever said rise rate attains a predetermined value, to dislodge solids from said upper surface of said bed, store filtered solids at loci within said bed, and reduce said rise rate to extend said filtration time between backwashes; and
    (e) backwashing said filter bed at an upward fluidizing velocity after completion of two or more said pulses.

2. The method according to claim 1, wherein:
said pulse system is activated only when said liquid level above said bed attains a predetermined first value.

3. The method according to claim 2, wherein:
said fluidizing backwash is initiated when said liquid level above said bed attains a predetermined second value higher than said first value.

4. The method according to claim 1, wherein:
said pulse system is activated at a present time following initial introduction of said influent liquid into said filter tank beginning said filtration cycle.

5. The method according to claim 1, wherein:
each of said pulses is maintained for 5 to 180 seconds.

6. The method according to claim 1, wherein:
each of said pulses is maintained for 10 to 120 seconds.

7. The method according to claim 1, wherein:
an interval of time between said pulses is equal to or greater than a minimum preset time delay.

8. The method according to claim 7, wherein:
said minimum preset time delay between said pulses is 2 to 30 minutes.

9. The method according to claim 1, wherein:
an interval of time between said pulses is equal to or less than a maximum preset time interval.

10. The method according to claim 9, wherein:
said maximum preset time interval between said pulses is 20 to 300 minutes.

11. The method according to claim 1, wherein:
said pulsing fluid is a gas.

12. The method according to claim 1, wherein:
said pulsing fluid is a gas motivated upwardly at 1 to 5 feet per second (0.3 to 1.52 m/sec.) through orifices below said lower surface of said filter bed.

13. The method according to claim 1, wherein:
said pulsing fluid is air.

14. The method according to claim 1, wherein:
said pulsing fluid is air motivated upwardly through said filter bed in each pulse by a rising liquid level in each of a plurality of bed support sectors below said filter bed, said rising liquid level trapping and forcing said air upwardly in each individual sector.

15. The method according to claim 1, wherein:
said fluid is pulsed upwardly while continuing to introduce said influent liquid into said filter tank.

16. The method according to claim 1, wherein:
said pulsing fluid is a liquid directed upwardly through an upper portion only of said filter bed.

17. The method according to claim 16, wherein:
said pulsing fluid is filtrate from said granular medium filter bed.

18. The method according to claim 1, wherein:
said fluidizing backwash is initiated following completion of a predetermined maximum number of said pulses.

19. The method according to claim 18, wherein:
said predetermined maximum number of pulses is 8 to 30.

20. The method according to claim 1, wherein;
said fluidizing backwash is initiated after a predetermined filtration time has elapsed.

* * * * *

UNITED STATES PATENT AND TRADEMARK OFFICE
CERTIFICATE OF CORRECTION

PATENT NO. : 4,693,831
DATED : Sep. 15, 1987
INVENTOR(S) : Gary A. Garzonetti

It is certified that error appears in the above-identified patent and that said Letters Patent is hereby corrected as shown below:

IN THE SPECIFICATION:

Column 2, line 15, change "present" to -- preset --.

Column 2, line 23, change "present" to -- preset --.

IN THE CLAIMS:

Claim 1, line 26, change "initated" to -- initiated --.

Claim 4, line 45, change "present" to -- preset --.

Signed and Sealed this

Twenty-third Day of February, 1988

Attest:

DONALD J. QUIGG

*Attesting Officer*     *Commissioner of Patents and Trademarks*